3,314,937
PROCESS FOR PRODUCING HIGHLY POLYM-
ERIZED DESOXYRIBONUCLEIC ACIDS
Roger Vendrely and Colette Vendrely (born Randavel), Villejuif, and Jean Philippe Simon Vallée, Grenoble, France; said Roger Vendrely and said Colette Vendrely assignors of one-fourth to said Vallée and three-fourths to Centre Nationale de la Recherche Scientifique, Paris, France, a public establishment of France
No Drawing. Filed July 28, 1964, Ser. No. 385,805
Claims priority, application France, July 30, 1963, 943,181, Patent 1,371,944
5 Claims. (Cl. 260—211.5)

This invention relates to a process for preparing desoxyribonucleic acids, applicable to any variety of animal tissue, whether it be spermatozoon (for instance sea-urchins or fish) or tissues of superior animals (for instance nucleated erythrocytes, thymus, liver, kidney or spleen).

The process is sufficiently simple and economical to be applied with advantage on an industrial scale; it does not require onerous equipment and, in spite of these characteristics, it can produce a product which is capable of competing with the best samples prepared in specialized laboratories. It is to be reminded that, until now, the industry has been unable to produce, otherwise than by a process of a specialized scientific laboratory, a product of quality, namely a non depolymerized desoxyribonucleic acid which has retained all its physico-chemical properties (for instance viscosity of its solutions, speed of sedimentation of the molecules etc. . . .).

The desoxyribonucleic acid is localized in the cellular nucleus where it is combined with basic proteins (histones in the nuclei of somatic tissues; protamines in the gametes; spermatozoons of certain fish). These histones or protamines must be separated from desoxyribonucleic acid during its process of preparation and must also be eliminated from the reaction medium in order that in the final phase of the operation, they would not be carried along with the isolated nucleic acid to contaminate the same.

It is known, at a laboratory scale, to utilize saline solutions with high ionic concentration in order to extract the nucleoproteins and, at the same time, to effect the liberation of nucleic acid. This process cannot be easily applied on an industrial scale because it requires large volumes for a small yield and because the elimination of the protein fraction by centrifuging requires an onerous apparatus.

One of the applicants has already suggested, in his French Patent No. 1,245,818 of Nov. 27, 1959, a process for the preparation of desoxyribonucleic acids with a high degree of polymerization according to which the quality of the current industrial product was improved. However, this process was still somewhat difficult to perform and too expensive.

The process according to the present invention is remarkable in that the tissue, eventually sterilized and partially delipidated by washing with alcohol, is subjected to the solubilizing and cleaving effect of sodium chloride by contact with this material in crystalline form, which results in the extraction of the desoxyribonucleoprotein and its cleavage into free nucleic acid and protein with a reduced bulkiness in a semi-solid medium.

The invention also provides the completion of protein removal, while operating in the semi-solid medium, by thermic shock at 75 to 80° C. which has the effect, first to break the bonds which unite the acidic groups of the nucleic acid to the basic groups of the protein; secondly, to denature the protein and to promote its flocculation; and third, to permit the dissolving of the free desoxyribonucleic acid.

The desoxyribonucleic acid is thereafter dissolved in a greater volume of the solvent having a smaller ionic strength. It is then purified by filtration, or, if desired, by sedimentation and separated by addition of alcohol.

As an example, there is given herebelow a non-limitative detailed description of the process according to the present invention applied to an industrial extraction of desoxyribonucleic acid from tunny milt.

100 kg. of tunny milt are very finely chopped in the presence of 60 liters of ethyl alcohol at 95%, the entire mass being maintained at a maximum temperature of +4° C. and preferably between +2 and +4° C. The contact is maintained by agitation in a 300 liters useful volume apparatus, made of stainless steel, enamelled cast iron or plastic material such as that known under the trademark "Covidur," this apparatus being provided with a coil or a jacket in which it is possible to circulate either a refrigerating brine, or water, or still water-vapor under low pressure, 1 kg. maximum.

After having been agitated for approximately 1 hour, the mixture is permitted to rest for at least another hour, always at a temperature between +2 and +4° C. The obtained thick liquid and white cream is conveyed into a filter-press with chambers for recuperating the solid, approximately 65 kg., and the eliminated alcoholic liquor is conveyed for recuperation by distillation.

The residue is replaced in the same apparatus, always refrigerated and maintained between +2 and +4° C., is diluted with 65 liters of pure cold water, and 47 kg. of crystalline sodium chloride are incorporated thereto by agitation and always at the maintained cold temperature; the agitation is continued to complete homogeneity. There is thus obtained a sufficiently thick paste which is always kept between +2 and +4° C., during 2 to 3 days, each day, morning and evening, the mass being stirred for approximately 15 minutes. One can observe an increase in fluidity of the mass which, however, remains very viscous.

After this stay at low temperature, there is then introduced, into the jacket of the apparatus, water which is maintained by heating at 90° C., with constant agitation of the mass so as to raise its temperature to 80° C.; this temperature is maintained for 1 hour, while agitating, whereafter heating is stopped and 100 kg. of crushed ice are added into the mixture while agitating; then, the whole is transferred into a tank of stainless steel or enamelled cast iron and again mixed with 250 kg. of crushed ice prepared in said tank with 300 liters of pure water. The tank should have a volume of 900 to 1000 liters and the agitation is effected by means of a removable electric stirrer.

The contents of the tank are then conveyed into a filter press with chambers where there is recuperated a volume of 700 liters of filtrate and the residue remaining in the filter weighs approximately 120 kg.

Finally, in another tank with a removable stirrer having a capacity of 1600 to 1700 liters and made of stainless steel, there are rapidly added into the 700 liters of the decanted filtrate, a volume of 700 liters of ethyl alcohol at 95%. There is observed an abundant precipitation of fibrous crude desoxyribonucleic acid which surrounds the stirrer. The product is then drained and slowly dried in the surrounding atmosphere. There are thus produced about 4500 g. of crude desoxyribonucleic acid. This yield represents from 75 to 80% of the amount of desoxyribonucleic acid contained in the starting milt when one uses red tunny milt (*Thunnus thynnus* de Linne).

The same procedure is applicable to the milts of herring (*Merlucius merlucius*) coalfish, salmon or trout. The yields always are 75 to 80% of the quantity of desoxyribonucleic acid initially existing in the treated milts.

The crude product thus prepared is a sodium salt of the desoxyribonucleic acid. It is obtained in the form of long white or slightly colored fibers having the appearance of asbestos or of crude yarn.

Samples subjected to analysis, although still containing an excess of sodium chloride, have presented the following chemical and physico-chemical analysis:

| | Percent |
|---|---|
| Humidity | 11 to 12 |
| Phosphorous | 7.0 to 7.6 |
| Nitrogen | 12.0 to 12.6 |
| Residual proteins | <.5 |

The specific absorption in ultraviolet light was in the order of 73000. The average molecular weight determined by diffusion of light, varied from 1.5 to $2.5 \cdot 10^6$.

In conclusion, the obtained samples present characteristics which are much superior to those of all commercial products presently on the market.

*Purification of the product*

The crude desoxyribonucleic acid is purified by redissolving in a solution of 0.05 M of sodium chloride (50 liters for 100 to 200 g. of desoxyribonucleic acid). The solution is centrifuged and precipitated by addition of an equal volume of alcohol. This operation can be re-repeated several times.

What we claim is:

1. A process for the manufacture of highly polymerized desoxyribonucleic acids which comprises contacting sterilized and alcohol-washed animal tissue containing said acids with solid sodium chloride crystals, subjecting the mass thus obtained to a thermic shock in a semi-solid medium to remove adhering proteins and facilitate extraction of desoxyribonucleoprotein; and splitting the latter into free nucleic acids and protein.

2. The process as defined in claim 1, wherein said contacting is carried out at a temperature of 2 to 4° C.

3. The process as defined in claim 1, wherein said thermic shock is applied at a temperature ranging from 75 to 80° C.

4. A process for the manufacture of highly polymerized desoxyribonucleic acid which comprises contacting a sterilized and alcohol-washed animal tissue containing said acids with solid sodium chloride crystals at a temperature of 2 to 4° C.; subjecting the mass thus obtained, while in semi-solid state, to a thermic shock at a temperature of 75 to 80° C. to remove adhering proteins and to facilitate extraction of desoxyribonucleoprotein; and splitting the latter into free nucleic acids and protein.

5. Highly polymerized desoxyribonucleic acids produced by contacting sterilized and alcohol-washed animal tissue containing said acids with solid sodium chloride crystals at a temperature of 2 to 4° C.; followed by subjecting the mass thus obtained, while in semi-solid state, to a thermic shock at a temperature of 75 to 80° C.; and splitting of the desoxyribonucleoprotein thus obtained into free nucleic acids and protein.

References Cited by the Examiner

UNITED STATES PATENTS

| 2,387,040 | 10/1945 | Redfern | 260—211.5 |
| 2,415,826 | 2/1947 | Laufer et al. | 260—211.5 |
| 2,719,844 | 10/1955 | Dimroth et al. | 260—211.5 |
| 3,147,185 | 9/1964 | Charney | 260—211.5 |

FOREIGN PATENTS

| 1,245,818 | 10/1960 | France. |

ELBERT L. ROBERTS, *Primary Examiner.*

JOHNNIE R. BROWN, *Assistant Examiner.*